United States Patent [19]

Pfau

[11] 4,057,703

[45] Nov. 8, 1977

[54] METHOD OF MACHINING BY EROSIVE ELECTRICAL DISCHARGES

[75] Inventor: Jean Pfau, Geneva, Switzerland

[73] Assignee: Ateliers des Charmilles S.A., Geneva, Switzerland

[21] Appl. No.: 630,959

[22] Filed: Nov. 12, 1975

[30] Foreign Application Priority Data

Nov. 14, 1974 Switzerland ............... 15183/74

[51] Int. Cl.² ............................................. B23P 1/08
[52] U.S. Cl. ................... 219/69 C; 219/69 G; 219/69 M; 219/69 V; 364/474
[58] Field of Search ............ 219/69 M, 69 V, 69 C, 219/69 G; 318/571; 235/151.11

[56] References Cited

U.S. PATENT DOCUMENTS

| 3,564,190 | 2/1971 | Kaudajau et al. | 219/69 V |
| 3,581,045 | 5/1971 | Panschow et al. | 219/69 G |
| 3,591,761 | 7/1971 | Bederman et al. | 219/69 V |
| 3,739,136 | 6/1973 | Marendaz | 219/69 C |
| 3,816,692 | 6/1974 | Rutmansky | 219/69 C |
| 3,875,374 | 4/1975 | Inoue | 219/69 G |

OTHER PUBLICATIONS

Jaques, "Application in EDM of Synchronized Pulsed Flushing ...", SAE 680638, Oct. 1968.

Primary Examiner—Bruce A. Reynolds
Attorney, Agent, or Firm—Hauke & Patalidis

[57] ABSTRACT

A process and apparatus for achieving relative displacement between the electrode tool and the electrode workpiece of an EDM apparatus about a closed or looped path at a speed varying as a function of the machining gap width, such as to remove material from the machined surfaces at a substantially constant material removal rate.

13 Claims, 7 Drawing Figures

METHOD OF MACHINING BY EROSIVE ELECTRICAL DISCHARGES

BACKGROUND OF THE INVENTION

The invention relates to a method of machining by erosive electrical discharges initiated and supplied with current by a succession of voltage pulses applied between an electrode tool and an electrode workpiece, according to which a relative displacement between these electrodes is achieved along a cyclic translation movement following a closed path inscribed in a surface of predetermined shape and in such a manner as to decrease the gap between these electrodes on a portion of the machined surface and to produce a cyclic displacement of the machining zone.

Machining by electro-erosion comprises in general a phase of rough shaping followed by one or several finishing phases during which the machining rate and the gap comprised between the electrode tool and the electrode workpiece are progressively and simultaneously decreased. A known machining process (French Pat. No. 1,274,953) permits to effectuate all these operations with the same electrode tool. The process consists in displacing the electrodes one relative to the other according to a loop shaped path such as to reduce the machining gap to the value corresponding to the rate of machining imposed on a portion of the surface to be machined and to provide a cyclic displacement of the machining zone on that surface. This displacement is a translation which may be executed according to a circular path or according to a rectangular path if the surfaces to machine are orthogonal, or again according to a path inscribed in a surface of predetermined form or shape.

This known machining process presents a drawback when machining surfaces having a section of variable curvature or when machining plane surfaces of different sizes. For example, in the case of machining a surface of variable curvature by effecting a circular translation movement, the machining zone is displaced at a speed varying proportionally to the radius of curvature of this surface. As the removal of material is inversely proportional to the speed of displacement of the machining zone, the surface portions of small curvature radius are machined more rapidly than the surface portions of large curvature radius, so that the machining gap varies during each translation cycle and causes variations in the machining current, resulting consequently in a decrease of the efficiency of machining. The machining gap becomes progressively wider and, as a result, machining of the surfaces of small radius of curvature stops and an important loss of machining efficiency occurs at each cycle of the translation movement.

The same phenomenon arises in the case of plane orthogonal surfaces of different sizes, for example, when machining lateral surfaces of a rectangular cavity. In this case, owing to the fact that each surface is subjected to electrical discharges at the same time, the density of discharges is larger on the surface of small size than on those of large size, such that the machining progresses more rapidly on the surfaces of small size and the machining current decreases during machining of these surfaces until it becomes nil. In addition, the increase of the gap at the angles prevents the electrical discharges from occuring during a relatively long time and results in an important drop in efficiency.

SUMMARY OF THE INVENTION

The new method, according to the present invention, aims to eliminate these losses of time and to permit a maximum machining efficiency. This method is characterized in that, during at least one cycle of translation, the speed of translation is varied so as to remove for all the machined surfaces of the workpiece the same quantity of material per unit area.

Thus, modifying the translation speed, so as to equalize the material removal on all the portions of the surface subjected to machining, permits to eliminate partly or even completely the machining stoppages and the current variations during the translation. The speed of translation may be controlled so as to maintain within predetermined limits during each translation cycle a value representing the machining gap.

The invention has also for object an apparatus for practicing the aforesaid process.

BRIEF DESCRIPTION OF THE DRAWING

Three embodiments of this apparatus are described hereafter by way of examples and with reference to the attached drawing, in which.

DETAILED DESCRIPTION OF THE PREFERRED EMBODIMENT

Figure 1:
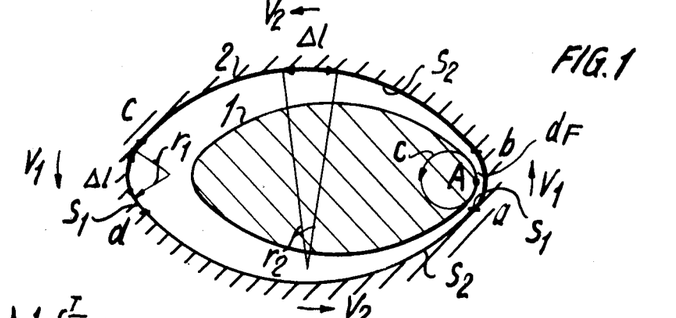
FIG. 1 is an explanatory view relating to the machining of a lateral surface of a hole of oval shape.

FIG. 1 shows an example of machining of the lateral surface of a hole which presents, in section, two different radii of curvature.

The electrode tool 1 is displaced with respect to the workpiece 2 along a circular translation path, so that point A of the electrode follows a circular path C. The machined surface presents two portions $S_1$ of curvature $r1$ and two portions $S_2$ of curvature $r2$ larger than $r1$. When the point A of the electrode 1 follows the circle C at constant speed, the displacement speed of the machining zone, which is defined by the reduced gap $dF$, is proportional to the radius of curvature of the machined surface so that the speed of displacement of this zone takes the value $V_1$ when this zone passes the segments $ab$ and $cd$, and the value $V_2$ greater than $V_1$ when it follows the segments $bc$ and $da$. The removal of material being inversely proportional to the speed of displacement of the machining zone, the gap increases more quickly during the machining of portions $S_1$ than during the machining of portions $S_2$. This results in a variation of machining current in the course of each translation cycle, thus causing a variation of the gap, and consequently a deformation of the workpiece.

The process according to the invention permits to keep the difference between the extreme values of the machining gap $dF$ within predetermined limits in varying the translation speed, so as to maintain, for example, the means machining current within predetermined limits. In these conditions, the variation between the speeds $V_1$ and $V_2$ of displacement of the machining zone is reduced in the same proportion during each translation cycle, and the machining can progress at the same speed (perpendicular to the surface to be machined) on all parts of the surface of the workpiece, i.e., the same quantity of material per unit of surface is removed on all the areas of the machined surface.

Figure 2:
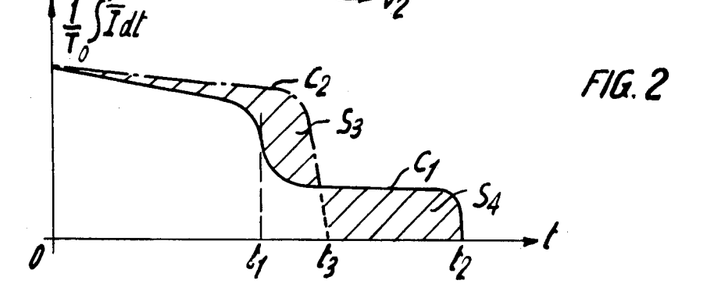
FIG. 2 is a diagram of machining time of the hole according to FIG. 1.

FIG. 2 is a diagram illustrating the advantages of the invention in the case of FIG. 1. The time during which machining proceeds is indicated on the coordinate, and on the ordinate is shown the mean value of the calculated mean machining current, for example, during each cycle T of a translation, this mean value following the curve $C_1$ when, according to the known technique of the prior art, the speed of translation and the amplitude of movement remain unchanged.

At the instant $t_1$, this mean value drops due to the fact that the areas $S_1$ of the workpiece are no longer subjected to machining. Machining continues on the areas $S_2$ up to the instant $t_2$.

In varying the translation speed according to the process of the invention and in imposing the same rate of machining, the mean value of the current during each cycle follows the curve $C_2$. It is apparent that the mean value of the current is higher and that machining is terminated at the instant $t_3$. The gain in machining time is represented by the interval $t_2 - t_3$. The quantity of removed material being the same in both cases, the surfaces $S_3$ and $S_4$ are equal.

Figure 3:
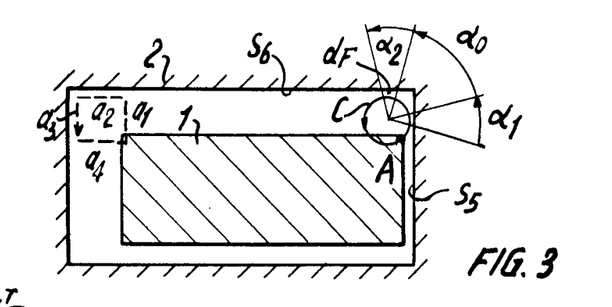
FIG. 3 illustrates the machining of the lateral surfaces of a cavity of rectangular shape.

FIG. 3 illustrates another example of machining in the case of a rectangular hole in a workpiece.

After the finishing phase, the electrode tool is displaced by translation along a circular path C. In this case, machining of the areas $S_5$ and $S_6$ respectively, occurs when the translation trajectory executes the angles $\alpha 1$ and $\alpha 2$, respectively. These angles having equal values, each area is subjected to machining during the same time interval. By contrast, during the translation $\alpha 0$, the machining gap takes too high a value to permit initiation of the discharges. If the area $S_5$ is smaller than the area $S_6$, the density of the discharges on this area $S_5$ will be the highest, and consequently the progress of machining will be more rapid on the area $S_5$ than on the area $S_6$. The mean machining current oscillates between two values as in the preceding case, but in addition an interruption occurs during the translation $\alpha 0$.

In varying the speed of translation, the "dead time" during which the machining is interrupted is reduced to a minimum and the areas $S_5$ and $S_6$ are subjected to machining during different time intervals, so as to maintain the mean current within the limits which depend on the sensitivity of the speed adjusting apparatus.

For this particular shape of the workpiece, translation according to a square path $a_1, a_2, a_3, a_4$ would have the advantage of machining the four corners of the workpiece. In this case also, a variation appropriate to the speed of translation permits an increase in the efficiency of machining.

Figure 4:
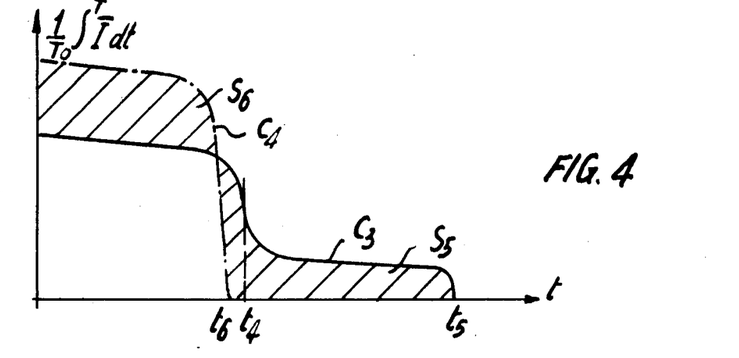
FIG. 4 is a diagram of relative time of machining of this cavity.

FIG. 4 is a diagram illustrating the advantage which can be obtained by the present invention in the case of the example of FIG. 3. According to the known method of machining, the mean value of the current during each translation cycle follows the curve $C_3$. From time O to time $t_4$ only the area $S_6$ is machined. Starting at the instant $t_4$, the machining occurs only on the area $S_6$ and the operation is terminated at the instant $t_5$. In utilizing the process of the invention, the value of the current follows the curve $C_4$. There is shown a strong increase of means current owing to the fact that the time intervals without machining have been reduced, so that the operation is terminated at the instant $t_6$ and the gain in time represented by the interval $t_6 - t_5$ takes a value yet larger than in the preceding example.

The process of the invention is also advantageous when finishing operations succeed each other one after the other, the passage of an operation to the following being effected when the mean current or a characteristic value of the machining gap becomes smaller than a reference value.

Figure 5:
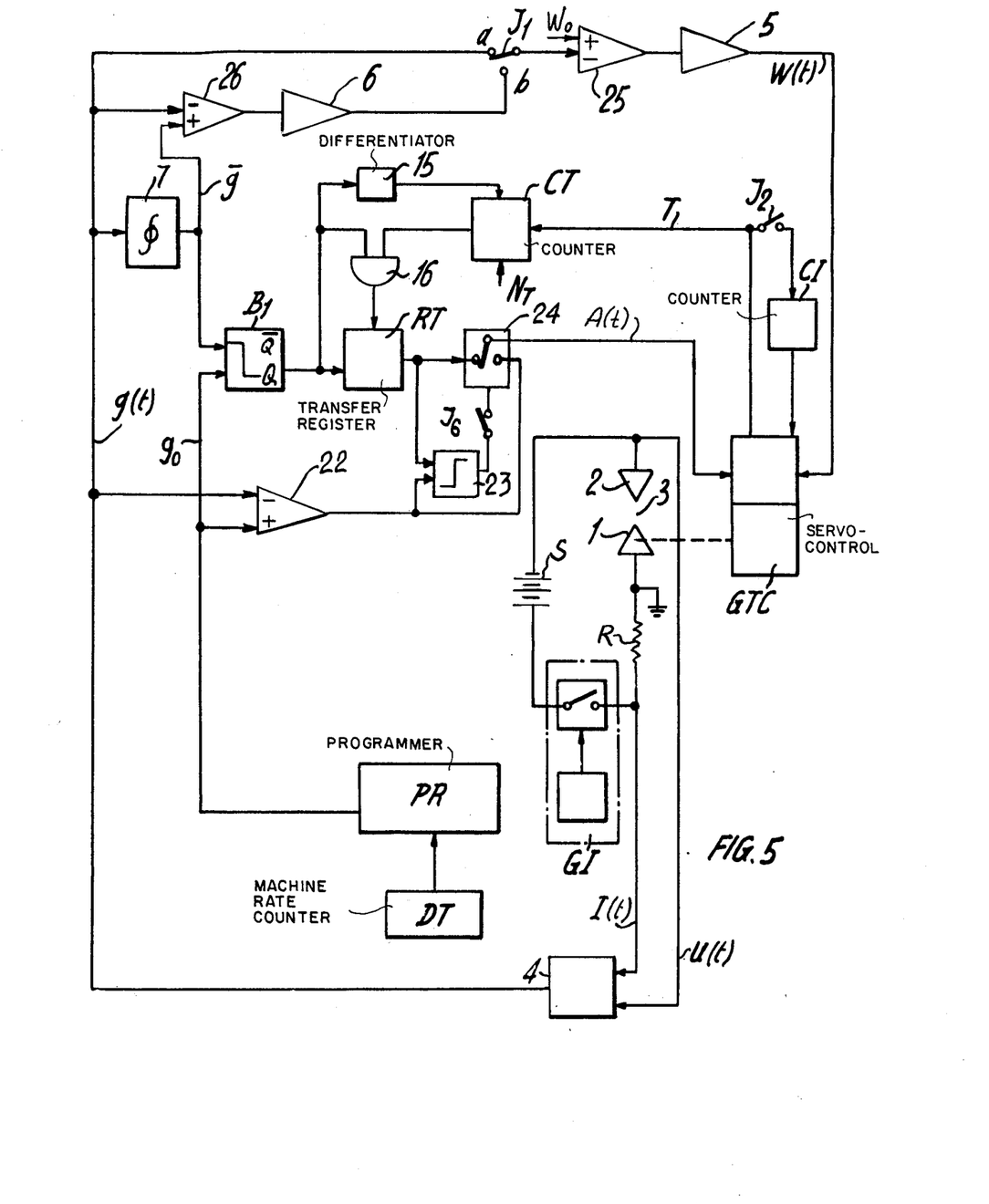
FIGS. 5 to 7 show the circuit diagrams of three embodiments of apparatus for practicing process according to the invention.

FIG. 5 shows an apparatus for carrying out the process of the invention. In this apparatus, a source S delivers the current supply to a machining gap 3 between an electrode 2 and a workpiece 1 through a pulse generator GI controlled by a programmer PR.

The machining voltage $U(t)$ and the machining current $I(t)$, the latter being a function of the voltage drop across a resistor R in series in the machining circuit, are applied at two inputs of a circuit 4 adapted to deliver a signal $g$ which is characteristic of the machining gap width. This signal $g$ is compared with a reference signal Wo in a comparator 25 for supplying a signal representing the difference between the mean voltage between the workpiece 1 and the electrode 2 and the desired voltage which is represented by the signal Wo. The output signal of the comparator 25 is fed through an amplifier 5 to a servo-control apparatus GTC controlling the translation of the electrode 2 relatively to the workpiece 1.

The signal $W(t)$ applied to the servo-control apparatus GTC controls the speed of translation such that a drop in the machining voltage with respect to the reference signal Wo, which indicates that the gap is narrower than desired, produces an increase of the translation speed and vice versa.

The apparatus according to FIG. 5 comprises yet different components which permit a correction of the speed of translation with respect to a signal representing the mean value of the machining gap during one complete translation cycle. To this effect, an integrator circuit 7 furnishes a signal $\bar{g}$ corresponding to the integration of the value $g$ during a cycle. Of course, this integrator 7 receives a reset pulse at each cycle of translation, the means for applying this pulse being not represented in the drawing.

The signal $\bar{g}$ is applied to one of the inputs of a comparator 26, the other input of which receives the signal $g$. The output of the comparator 26 is applied via an amplifier 6 to a switch J1. Thus, by the operation of this latter, it is possible to compare to the reference Wo either the instant signal $g$ or the difference between this instant signal and the mean value of this signal during the preceding cycle. Thus, when the switch J1 is in its position $b$, it acts on the speed of translation as a function of the difference between the instant value of the machining gap and its mean value at the time of the preceding cycle. This difference can, of course, be positive or negative, but after passage in the comparator 25, a value which presents always the same polarity is obtained.

The signal $\bar{g}$ is applied to a bistable flip-flop $B_1$, the second input of which receives a signal $go$ provided by the programmer PR. This signal $go$ defines the mean machining gap desired for the considered machining phase. This flip-flop $B_1$ responds in delivering a signal on its output Q each time the signal $\bar{g}$ is greater than $go$, i.e. each time the effective machining distance is greater than the desired mean value defined by the signal go.

The output signal of the flip-flop $B_1$ is applied to an input of a transfer register RT, the second input of which receives through an AND gate 16 a signal provided by a counter CT. The counter CT receives at each translation cycle a pulse arriving by a line T and produces a signal each time the number of the received pulses is equal to a number defined by an input NT.

When the mean machining gap, illustrated by the signal $\overline{g}$, becomes greater than the gap defined by the signal go, the flip-flop $B_1$ changes its state. Its output signal is applied, on the one hand to the AND gate 16, and on the other hand to a differentiator 15, the output of which controls the reset of the counter CT. This latter counts a number of translation cycles equal to NT and then gives a signal to a second input of the gate 16. The AND gate 16 is then conductive, and the transfer register RT increases of one step is output signal $A(t)$ to increase the amplitude of the translation movement between the electrode and the workpiece. In this way, the correction of the amplitude of the translation is not effected immediately, but only after the counting by the counter CT of the number of cycles defined by NT.

The circuit is also provided with means permitting alternation of a phase of machining in which the amplitude of the translation is regulated as a function of the instant electrical discharge conditions with a phase of machining during which the speed is varied as explained above. To this effect, the apparatus comprises a differential amplifier 22 fed with the signals $g(t)$ and go for supplying an instantaneous signal of variation. This latter is applied, on the one hand, to a bistable flip-flop 23 and, on the other hand, to a switch 24. The flip-flop 23 receives on its other input the output signal of the register RT. If the switch J6 is closed and the flip-flop 23 gives a signal indicating that the regulated amplitude is lower than the value defined by the register RT, the switch 24 changes its position to apply to the servo control GTC the output signal of the amplifier 22. When the regulated amplitude from the differential amplifier 22 reaches the value defined by the register RT, the output signal of the flip-flop 23 disappears and the switch 24 returns to its rest position, with the result that the amplitude of the translation is maintained at a fixed value until a new signal is furnished by the flip-flop 23.

The circuit of FIG. 5 shows also that the translation servo control device GTC is driven by the output signal of a counter GI, the input of which can be connected by a switch J2 to the line T which receives a pulse at each translation cycle. This arrangement permits to invert the sense of the translation movement after a predetermined number of cycles counted by the counter CI.

The programmer PR has a further input fed by a machining rate control DT for changing the machining rate according to a pre-established program.

Figure 6:
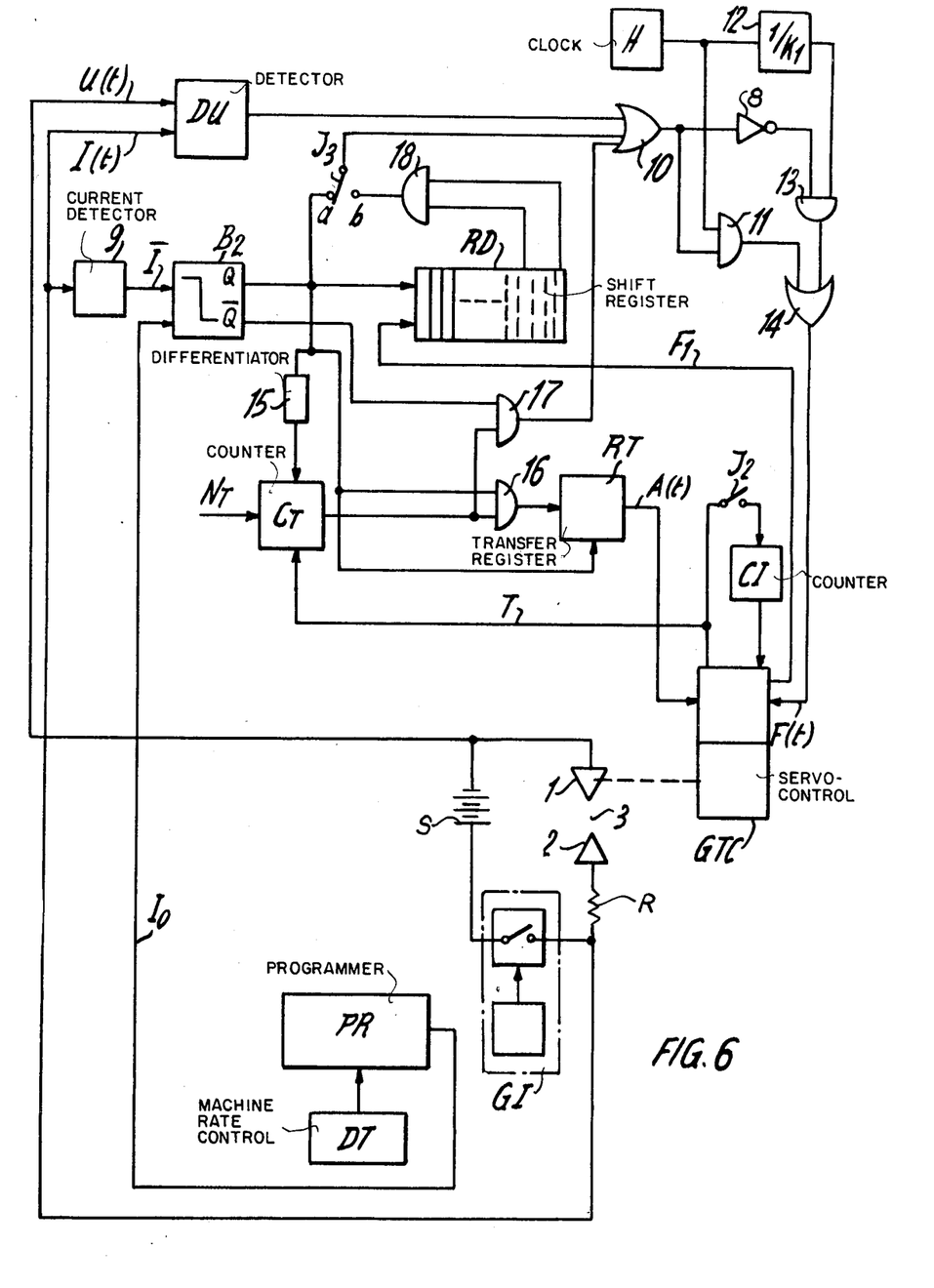

FIG. 6 illustrates another embodiment of the invention in which certain parts are the same as those of the apparatus described with reference to FIG. 5. These common parts carry the same reference numerals and are not described anew.

In the diagram of FIG. 6, the translation servo control GTC differs from that of FIG. 5 in the sense that instead of being controlled by an analogous signal $w(t)$, it is sensitive to the frequency of pulses $F(t)$ formed from a clock H by divider 12, and led to the servo control GTC via the AND gates 11 and 13 and the OR gate 14. The pulses of the clock H correspond to the high frequency giving the maximum speed of translation controlled by the servo control GTC, while the frequency coming out of the divider 12 gives the lowest speed of translation.

In the case of FIG. 6, the watched characteristic value is the signal Io furnished by the programmer PR to the pulse generator GI. This signal Io is applied to an input of a flip-flop $B_2$, the other input of which receives a signal $\overline{I}$ defining the means machining current, said signal $\overline{I}$ being produced by an element 9 such as a current detector. When the signal $\overline{I}$ is smaller than the reference signal Io, the flip-flop $B_2$ gives a signal on its output Q. Like in FIG. 5, this signal passes through a differentiator 15 for resetting the counter CT. On the other hand, this same signal can be applied by a switch J3, in its posibion a, to one of three inputs of an OR gate 10 the output of which drives the AND gate 11 to lead the pulses of the clock H to the line $F(t)$ via the OR gate 14 and thus controlling the maximum speed of translation. It should be noted that the output signal of the OR gate 10, via an inverter 8, locks the AND gate 13. When the OR gate 10 does not provide an output signal, the AND gate 11 is locked, while the AND gate 13 is open, thus giving passage to the pulses from the divider 12 to control the minimum speed of the translation movement.

The control of the translation at the maximum speed is of course operated each time a signal is applied to one of the three inputs of the OR gate 10. This is the case especially when a signal is furnished by a detector DU which is responsive to the presence of abnormal machining conditions. These conditions are checked by the detector DU in response to the machining voltage $U(t)$ and to the machining current $I(t)$.

The third input of the OR gate 10 is driven by the output of an AND gate 17, the inputs of which are connected respectively to the output $\overline{Q}$ of the flip-flop $B_2$ and to the output of the counter CT. In this way, the AND gate 17 initiates the maximum speed of translation after a predetermined number of translation cycles checked by the counter CT has passed during which the mean current was higher than that of the reference Io. This maximum speed of translation is intended to provide a better cleaning of the machining zone.

When the switch J3 is in its position b, the high speed of translation is switched on when a signal is furnished at the output of an AND gate 18. The AND gate 18 has its inputs connected to a shift register RD which memorizes chronologically the changes of the output Q. The changes pass across this register RD at a speed determined by the frequency of the signal F1 which proceeds from the servo control GTC. Thus, in the course of a translation cycle which follows the cycle of registration of changes of state of the output Q, the changes in state memorized in the register RD are transmitted with an advance of phase in relation to the instantaneous position of the translation. Thus, an anticipation in the command of the variation of speed is obtained, which permits an increase of rapidity and precision in the regulation of speed.

Figure 7:
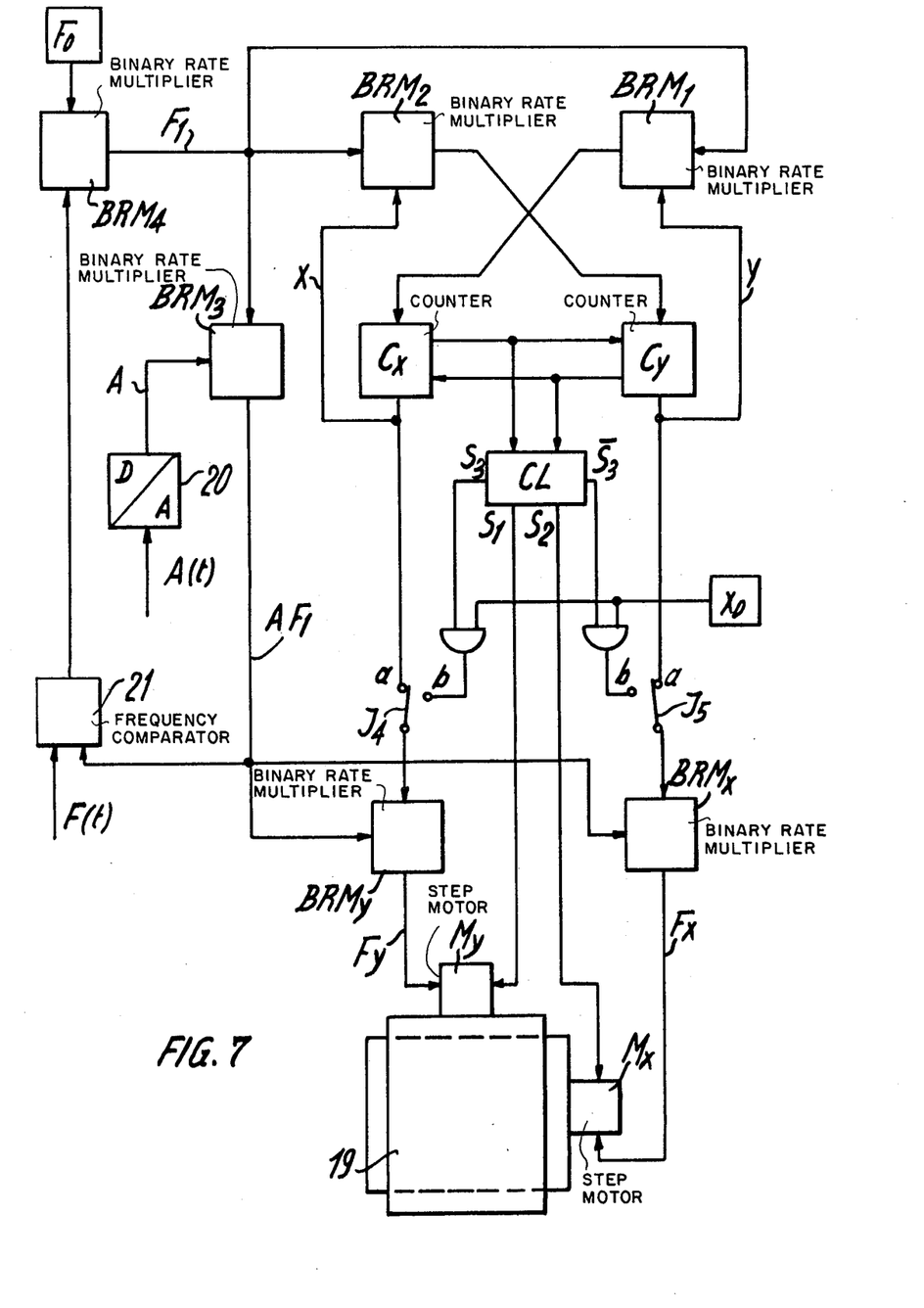

FIG. 7 shows an example of an apparatus of command of translation movement of variable speed and amplitude, according to a circular or a square path.

The servo control GTC of FIGS. 4 and 5 is replaced by means for controlling the resulting motion of a table of crossed movements 19 by way of stepping motors Mx and My controlled according to the diagram of FIG. 7.

This apparatus utilizes circuit elements known under the name "binary rate multiplier" BRM, into which successive pulses are introduced at a determined frequency and which produce at their output pulses the means frequency of which is proportional to the binary number shown at the input.

Pulses of frequency F1 are applied to the elements BRM1 and BRM2, the output pulses of which the respectively introduced into up-and-down preselection counters Cx and Cy counting up to a preselected number Xo and then counting down to zero, the counting up of one counter taking place during the counting down of the other. The numbers calculated by the counters Cx and Cy determine respectively the rate of variation of the frequencies of output of the elements BRM1 and BRM2. Under those conditions, the relationship of the frequencies at the output of the elements BRM1 and BRM2 is equal to the relationship of the number $y$ and $x$ and, consequently, these numbers correspond to the coordinates of a point being displaced in a circle at a speed proportional to the frequency F1.

The control pulses of the stepping motors Mx and My are supplied respectively by the binary rate multiplier elements BRMx and BRMy fed by the frequency $AF_1$ which is delivered by a binary rate multiplier element BRM3 controlled by a binary number A given by an analog-digital converter 20 fed by the signal A(t) of FIG. 5 or FIG. 6. Besides, the elements BRMx and BRMy are placed under the dependance of the numbers $y$ and $x$ supplied by the counters Cy and Cx.

The orders for inversion of the direction of movement of the motors is given by the signals $S_1$ and $S_2$ formed by a logic circuit CL as a function of the two signals indicating respectively the counting up and counting down of the counters Cx and Cy.

Thus, in order to vary the amplitude of the movement without changing the tangential speed, it suffices to vary the signal A(t) and the frequency $F_1$ in inverse relationship. On the other hand, if one varies $F_1$ without modifying A(t), the translation speed varies in the same proportions.

The signal of frequency $AF_1$ is made dependent on the reference frequency F(t) by means of a frequency comparator 21 which modifies the rate of variation of the pilot frequency Fo in acting on the binary rate multiplier element BRM4 so as to maintain the product A.F1 constant, whatever the value of the number A given by the converter 20. A translation movement according to a square path may be effected by placing the switches J4 and J5 in position b. In this case, the displacement speeds of the motors are proportional to XoAF1 or zero, according to the state of the logic signals S3 and S3̄ formed by the circuit CL, the numer Xo corresponding to the maximum capacity of the counters Cx and Cy.

The invention may be applied to other forms of translation path and to other control systems of these movements, for example electro-mechanical servo-systems with eccentrics or electro-hydraulic.

Of course, the process which has been described previously by way of example and which may be carried out by the apparatus illustrated in FIGS. 5 to 7 need not necessarily be carried out continuously during the machining. It may be adventageous to alternate the machining periods during which the speed of translation is varied while maintaining constant the path of this translation with other periods during which the path of the translation is not maintained constant, but is modified under the known action of a servo-mechanism which tends to maintain the machining gap constant.

The alternating of the machining periods as indicated above is advantageous, for it permits a higher machining speed, since the machining gap is continually maintained as small as possible, which gives a maximum machining current during the periods during which the path of the translation is not strictly determined. The exact outline of the machined surface is then obtained during the following period during which the path of translation is no longer modified, while the speed of translation varies in the sense which tends to give a uniform removal of material from all of the machined surface.

Each machining period must obviously comprise at least one complete closed cycle of translation, but in practice, it is advantageous to provide for machining periods, each comprising several tens of cycles of translation.

Finally, in the case where the modifications imposed on the speed are memorized, as explained, for example, with reference to FIG. 6, intersecting results can also be obtained in effecting a single registration of speed variations to communicate to the translation during a complete cycle of this latter, this registration of variations being then utilized without further modification up to the end of machining, as well as the action of the servo-mechanism which maintains the machining gap at a constant and predetermined value.

Having thus described the present invention by way of examples of embodiments for practicing the invention, modifications whereof will be apparent to those skilled in the art, what is claimed as novel is as follows:

I claim:

1. In a process for machining a surface of an electrode workpiece by electrical discharges initiated and supplied with current by a succession of voltage pulses applied to a machining zone across a machining gap between an electrode tool and said electrode workpiece according to which a relative displacement between said electrodes is achieved along a cyclic translation movement following a closed path inscribed in a surface of predetermined shape and in such a manner as to decrease the gap between said electrodes on a portion of the machines surface and to produce a cyclic displacement of the machining zone, the improvement comprising varying the speed of said translation movement so as to remove for all the machined surface of the workpiece the same quantity of material per unit area during at least one cycle of translation.

2. The improvement of claim 1 wherein said path of said translation is maintained in a predetermined shape.

3. The improvement of claim 2 wherein said speed variation is effected during periods of machining comprising several cycles of translation, said periods being separated from each other by periods of machining during which said translation has an amplitude which is regulated.

4. The improvement of claim 3 wherein the variations of said speed of translation are memorized and the same speed variations are effected during said periods of machining during which the amplitude of the translation movement is regulated.

5. The improvement of claim 1 wherein said speed of translation movement is regulated as a function of the variation between a reference value and an electrical value representing said machining gap and the machining current.

6. The improvement of claim 5 wherein said reference value is a value representing the means value of the value representing the machining gap computed during at least one cycle of translation movement.

7. The improvement of claim 1 wherein said speed of the cyclic translation movement is controlled according to a program of speeds pre-established as a function of the shape of the workpiece to be machined.

8. The improvement of claim 1 wherein successive and periodic inversions of the direction of the cyclic translation movement are effected, each period comprising at least one complete cycle of displacement of the machining zone.

9. An apparatus for machining a surface of an electrode workpiece by electrical discharges initiated and supplied with current by a succession of voltage pulses applied to a machining zone across a machining gap between an electrode tool and said electrode workpiece according to which a relative displacement between said electrodes is achieved along a cyclic translation movement following a closed path inscribed in a surface of predetermined shape and in such a manner as to decrease the gap between said electrodes on a portion of the machined surface and to produce a cyclic displacement of the machining zone, said apparatus comprising means for varying the relative displacement of the electrode tool and electrode workpiece according to a cyclic translation movement along a predetermined path, means for controlling the speed with which said cyclic translation movement is effected, said last mentioned means being responsive to a first electrical value, and means for modifying said electrical value as a function of the variation between a second electrical value representing the machining gap and the machining current and a reference value, wherein said first electrical value comprises two different electrical values one corresponding to the maximum speed of translation movement and the other corresponding to the minimum speed of translation movement, further comprising means for selecting one of said different electrical values, said last mentioned means responding as a function of the difference between said second electrical value and said reference value.

10. An apparatus according to claim 9, wherein means are provided for counting the number of cycles of translation movement occured during the time interval in the course of which the current of machining is constantly less than a reference current, and means are provided for increasing by a predetermined incremental value said second electrical value as soon as said counting means indicates a predetermined number of cycles of translation.

11. An apparatus according to claim 9, wherein means are provided for counting the number of cycles of translation movement during the interval of time in the course of which the current of machining is constantly higher than said reference value, and means are provided for giving to said first electrical value said first predetermined value as soon as said counting means indicate a predetermined number of translation cycles.

12. An apparatus for machining a surface of an electrode workpiece by electrical discharges initiated and supplied with current by a succession of voltage pulses applied to a machining zone across a machining gap between an electrode tool and said electrode workpiece according to which a relative displacement between said electrodes is achieved along a cyclic translation movement following a closed path inscribed in a surface of predetermined shape and in such a manner as to decrease the gap between said electrodes on a portion of the machined surface and to produce a cyclic displacement of the machining zone, said apparatus comprising means for varying the relative displacement of the electrode tool and electrode workpiece according to a cyclic translation movement along a predetermined path, means for controlling the speed with which said cyclic translation movement is effected, said last mentioned means being responsive to a first electrical value, and means for modifying said first electrical value as a function of the variation between a second electrical value representing the machining gap and the machining current and a reference value, wherein means are provided for counting the number of cycles of translation movement during the interval of time in the course of which the current of machining is constantly higher than said reference value, and means are provided for giving to said first electrical value said first predetermined value as soon as said counting means indicate a predetermined number of translation cycles.

13. An apparatus for machining a surface of an electrode workpiece by electrical discharges initiated and supplied with current by a succession of voltage pulses applied to a machining zone across a machining gap between an electrode tool and said electrode workpiece according to which a relative displacement between said electrodes is achieved along a cyclic translation movement following a closed path incribed in a surface of predetermined shape and in such a manner as to decrease the gap between said electrodes on a portion of the machined surface and to produce a cyclic displacement of the machining zone, said apparatus comprising means for varying the relative displacement of the electrode tool and electrode workpiece according to a cyclic translation movement along a predetermined path, means for controlling the speed with which said cyclic translation movement is effected, said last mentioned means being responsive to a first electrical value, and means for modifying said electrical value as a function of the variation between a second electrical value representing the machining gap and the machining current and a reference value, wherein means are provided for generating a first logic signal indicating the sign of the variation between said second electrical value and said reference value, means are provided for memorizing the chronological order of the changes of state of said first logic signal during a translation cycle, means are provided for generating a second logic signal in which the changes of state correspond with anticipation in the course of a following translation cycle of the memorized chronological order of changes of state of said first logic signal, and means are provided for varying said first electrical value as a function of said second logic signal.

* * * * *

UNITED STATES PATENT AND TRADEMARK OFFICE
CERTIFICATE OF CORRECTION

PATENT NO. : 4,057,703
DATED : November 8, 1977
INVENTOR(S) : Jean Pfau

It is certified that error appears in the above-identified patent and that said Letters Patent are hereby corrected as shown below:

Column 7, line 9, before "elements" insert --binary rate multiplier--.

Column 8, line 47, change "machines" to --machined--.

Signed and Sealed this

Eleventh Day of April 1978

[SEAL]

Attest:

RUTH C. MASON
Attesting Officer

LUTRELLE F. PARKER
Acting Commissioner of Patents and Trademarks